United States Patent

[11] 3,617,005

| [72] | Inventor | William S. Pearson |
| --- | --- | --- |
| | | Hampstead, Md. |
| [21] | Appl. No. | 808,250 |
| [22] | Filed | Mar. 18, 1969 |
| [45] | Patented | Nov. 2, 1971 |
| [73] | Assignee | Cypro Incorporated |
| | | Hampstead, Md. |

[54] COMMINUTING METHOD OF AND MEANS FOR CONDITIONING THERMOPLASTIC MOLDING MATERIAL
8 Claims, 6 Drawing Figs.

[52] U.S. Cl. ................................................ 241/18, 241/22, 241/25, 241/34, 241/36, 241/51, 241/101 M
[51] Int. Cl. ....................................... B02c 21/02, B02c 18/44, B02c 25/00
[50] Field of Search ........................................... 241/18, 22, 34, 36, 55, 91, 101, 224, 243, DIG. 23, DIG. 28, 25, 51, 101 M; 18/DIG. 18, DIG. 46, 30, 34

[56] References Cited
UNITED STATES PATENTS

| 2,575,380 | 11/1951 | Borton .......................... | 241/91 X |
| --- | --- | --- | --- |
| 2,906,466 | 9/1959 | Hopper ......................... | 241/34 |
| 3,000,055 | 9/1961 | Schlicksupp ................. | 18/30 |
| 3,258,210 | 6/1966 | Panning......................... | 241/243 X |
| 3,260,468 | 7/1966 | Beard............................ | 241/55 X |
| 3,418,694 | 12/1968 | Strauss ......................... | 18/30 |

Primary Examiner—Donald G. Kelly
Attorney—Hill, Sherman, Meroni, Gross & Simpson ABSTRACT: A method of an apparatus for conditioning thermoplastic material in the continuous making of articles in a machine to which the material is fed from a hopper in finely divided state and whereafter excess or scrap material trimmed from the articles and defective articles are comminuted for reuse in the machine. There is added to and commingling with the comminuted material finely divided virgin material to make up for the amount of plastic material remaining in the trimmed usable articles, and the mixture of material is delivered to said hopper.

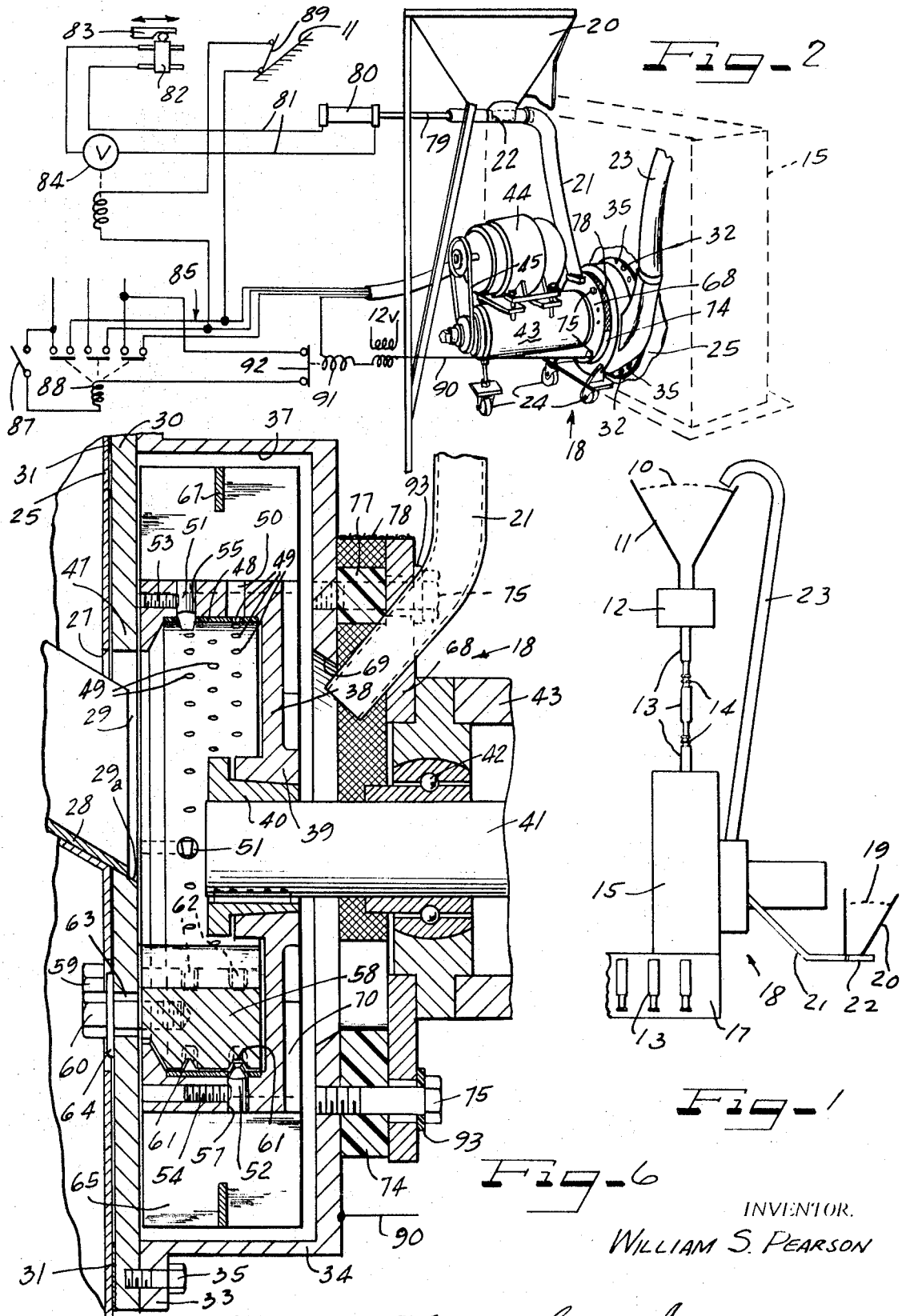

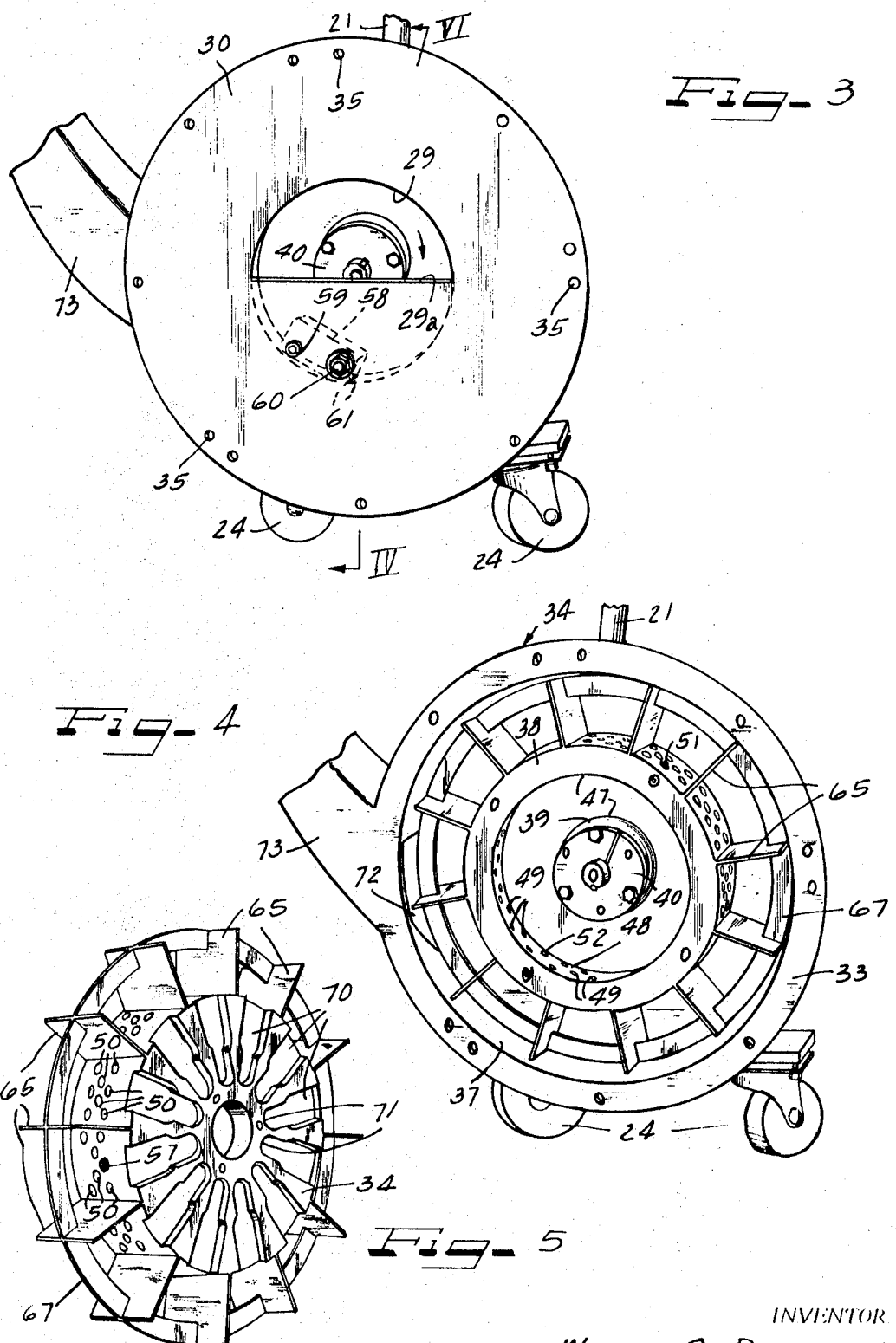

COMMINUTING METHOD OF AND MEANS FOR CONDITIONING THERMOPLASTIC MOLDING MATERIAL

This invention relates to the conditioning of thermoplastic material in the continuous making of articles, and is more particularly concerned with the reuse of excess or scrap material trimmed from or resulting from scrapping of molded articles.

In the mass production of thermoplastic articles, whether blow molded, such as bottles or injection molded as is common with respect to other types of articles, a significant amount of scrap material accrues from trimming from the articles of flash, sprues, connectors, and the like, and from defective or otherwise unwanted articles. Desirably such scrap should be reused, but at least a substantial percentage may be of too large size to be used efficiently with finely divided, pelletized or ground virgin material employed in the molding process, and should be reground.

In the molding process, some of the plasticizing oils in the thermoplastic material are driven off. While articles made from reground material appear to be slightly stronger than those made from entirely virgin material, efficient operation of extrusion equipment makes it desirable to have the plasticizing oils present in a reasonable amount. Where reground material and makeup virgin material are placed haphazardly in the supply hopper of molding equipment, there is a liability of uneven results.

According to the principles of this invention, highly advantageous and efficient conditioning of the thermoplastic material is accomplished by comminuting scrap material to a divided state for efficient reuse with virgin material, commingling the comminuted material with relatively finely divided virgin material supplied to make up for the plastic material remaining in the usable articles, and delivering the mixture to the hopper of the molding apparatus.

An important object of the present invention is to provide new and improved method of and means for conditioning thermoplastic material for the continuous making of molded articles from which excess material is trimmed for reuse.

Another object of the invention is to effect efficient mixing of reground and virgin material in the making of molded thermoplastic articles.

A further object of the invention is to provide new and improved comminuting or regrinding apparatus for thermoplastic material.

Other objects, features and advantages of the present invention will be readily apparent from the following detailed description of a preferred embodiment thereof taken in conjunction with the accompanying drawings, in which:

FIG. 1 is a schematic illustration of an apparatus system embodying features of the invention;

FIG. 2 is a perspective view of the thermoplastic comminuting and mixing apparatus, with control means shown schematically;

FIG. 3 is an inside face view of the comminuting and mixing apparatus;

FIG. 4 is a similar view with the front faceplate removed;

FIG. 5 is a perspective view of the rotor of the apparatus; and

FIG. 6 is an enlarged transverse sectional detail view taken substantially along the line VI—VI of FIG. 3.

In the schematic illustration of FIG. 1, thermoplastic material 10 in finely divided state is contained in a supply hopper 11 from which it is fed to any suitable molding apparatus 12, including blow molding or injection molding having the usual plasticizing and extruder means associated therewith, to produce molded articles 13. For illustrative purposes, the articles are shown as bottles connected by tabs 14 end to end to enable convenient handling of the molded string of bottle blanks and delivery of the same to trimming and finishing apparatus 15, the bottle blanks 13 are separated by trimming off the connecting tabs 14, and the blanks are further trimmed and finished as by sizing and reaming the neck or mouth portions of the bottles, whereafter the finished bottles are ejected as for example onto a takeoff conveyor or chute 17.

Excess material trimmed off as scrap from the bottle blanks is comminuted to the desired finely divided state for reuse, has added thereto and commingled therewith finely divided virgin material to make up for the amount of material remaining in the trimmed articles, and the mixture of reground and virgin material is delivered to the supply hopper 11. For this purpose, a combination comminuting and mixing apparatus 18 is positioned to receive the trimmings from the apparatus 15 and grind any pieces that are larger than desired. The finely divided virgin material 19 contained in a replenishing hopper 20 is charged through a duct 21 under the control of charging means 22 in the form of a plunger at the outlet from the hopper 20, correlated with operation of the trimming and finishing apparatus 15 to effect a substantially balanced loading of the apparatus 18 with trimmings and virgin material. Within the apparatus 18 the ground scrap material and makeup virgin material are thoroughly commingled and the mixture is delivered through a suitable duct 23 to the supply hopper 11. Desirably, the plastic material conditioning apparatus 18 comprises a self-contained unit which can be operatively assembled with the apparatus 15 and disassembled as desired for servicing convenience. To this end, the unit 18 is mounted on suitable casters 24 (FIGS. 2, 3 and 4) so that it can be wheeled into and out of position with respect to the apparatus 15 without requiring any hoisting or lifting assistance. To accommodate the conditioning apparatus 18, a housing wall panel 25 (FIGS. 2 and 6) of the apparatus 15 has a suitable opening 27 therein with means inside the housing such as a chute 28 arranged to deliver plastic trimmings through the opening 27 into and through a receiving opening 29 registering therewith in an inner circular faceplate 30 of the apparatus 18 confronting the cabinet or housing wall 25. For dust-free connection between the wall 25 and the panel 30, a gasket 31 may be interposed therebetween and position of the unit 18 is maintained as by means of the removable screws 32 which extend through an annular lateral flange 33 of a housing 34 of the unit and through the margin of the plate 30 into retaining, clamping threaded or bolted engagement with the wall 25. Primary attachment of the plate 30 to the flange 33 is by means of removable screws 35.

Plastic conditioning is effected within a circular working chamber 37 in the housing 34 by means of a combination comminuting, mixing and impeller rotor 38 of generally cup shape having its cavity receptively aligned with the opening 29 and provided with a hub 39 attached as by means of a keyed gripping bushing 40 to an end portion of a driving shaft 41 mounted on antifriction bearings rotatably in a shaft barrel 43 extending outwardly coaxially from the outer end of the housing 34 and either containing a drive motor, or, as shown, mounting thereon an electrical drive motor 44 having its drive shaft suitably connected with the rotor shaft 41 as by means of an endless flexible transmission element such as a belt 45 and suitable transmission pulleys.

Means are provided within the cavity of the rotor 38 for comminuting any pieces of plastic which are of larger than desired size and for ejecting from the rotor all pieces of plastic which are of small enough size whether or not comminution of the pieces has been necessary. To this end, the rotor has at the mouth of its cavity an inwardly beveled annular receiving lip flange 47 which directs material delivered through the opening 29 in the stationary plate 30 to an inner desirably cylindrical drum surface of the rotor which preferably has a replaceable wear ring liner 48 mounted thereon. Rotary driving of the rotor 38 is preferably at a high speed such as on the order of 2,400 r.p.m. such that particles of plastic which are of suitable small size will be ejected centrifugally through several, in this instance three, staggered annular axially spaced rows of gagging holes 49 in the linear 48 aligned with respective discharge holes 50 in the annular wall of the rotor.

Pieces of plastic which are not small enough to escape through the holes 49 are comminuted by means of cutter teeth 51 and 52 disposed at suitable circumferential positions such as quadrantly and in two axially spaced rows, removably locked as by means of setscrews 53 and 54, respectively, in radial respective sockets 55 and 57 in the rotor drum wall and with suitably shaped cutter bit ends projecting inwardly from the liner 48, and grindingly or comminutingly cooperative with a cutter block 58. This block is fixedly mounted on the inner side of the faceplate 30 below the opening 29 which is provided with a horizontal inwardly beveled lower edge 29a substantially above the block 58 to provide in the lower portion of the rotor cavity a substantial material receptacle.

In a desirable form, the block 58 is a substantially rectangular piece of metal secured by means comprising a pair of attachment bolts 59 and 60 to the inner face of the plate 30 below the edge 29a which is located adjacent to and parallel with a horizontal median plane across the comminuting cavity of the rotor 38 whereby to provide with the lower portion of the cavity a substantial plastic trimmings-receiving receptacle within which the block 58 is coactive with the teeth of the bits 51 and 52. In size the block 58 is proportioned to fit in closely spaced relation to the confronting surfaces within the grinding drum cavity of the rotor, as best seen in FIG. 6, namely, the inner radial wall surface, the surface of the lip flange 47, and the surface of the liner 48. This spacing is close enough to avoid large pieces from escaping past the block while fines may pass freely thereby in the rotation of the drum without gumming up due to relative passing frictional pressure.

Efficient grinding coaction between the grinding teeth and the block 58 is effected by having the block mounted with one end facing in opposition to the direction of rotation of the drum and head on to the plastic pieces in the lowest sector or pit within the drum. By its length and up-tilted disposition within the drum in the direction of rotation, the head on end face of the block is disposed at a diagonal angle converging with the surface of the liner 48 (FIG. 3) such that a grinding throat is provided leading to the lower corner of the block which is provided with grinding grooves 61 complementary to the grinding teeth and with the groove surfaces in closely spaced relation to the side contours of the teeth so as to comminute the plastic pieces as the teeth run through the grinding grooves in the high-speed rotation of the drum. By having the grooves 61 only in the lower corner portion of the block 58, and the lower edge face of the block extending in divergent progressively widening gap relation to the confronting liner perimeter relatively free movement of plastic particles onward from the groves avoids jam-up but enables agitation of the particles as they are advanced to a second-stage grinding coaction between the block and the teeth, as the teeth pass through complementary grinding grooves 62, substantially the same as the grooves 61 but located in the remaining lower, trailing corner of the block, with the lower face of the block converging toward such grooves and the drum liner surface. In this two-stage grinding to which the plastic pieces are subjected, extremely high-speed, efficient comminution is effected. To secure the most effective grinding setting of the block 58 relative to the grinding teeth, the block is adjustably mounted, with at least the bolt 60 adjacent the head end of the block extending through an adjustment slot or adjustment clearance opening 63 in the plate 30, with a heavy washer 64 bridging the opening. In the high-speed rotation of the grinding drum, all particles of small enough size are ejected centrifugally through the gaging holes 49 in the liner and the exit holes 50 in the rotor 38 into a substantial clearance about the rotor within the chamber 37.

To assist in ejection of the comminuted particles and fines from the grinding drum, and to evacuate the chamber 37, the rotor 38 is equipped with impeller fan means comprising a circumferentially spaced series of radial impeller vanes 65 mounted rigidly on the perimeter of the rotor and having a central reinforcing ring 67 rigidly connecting the outer margins of the vanes (FIGS. 4, 5 and 6). Thereby, air is drawn in through the grinding drum holes 49 through the aligned openings 27 and 29 from within the housing of the machine 15 not only to assist in evacuating the drum of comminuted particles and fines, but also to accelerate delivery of trimmings into the drum and to evacuate the machine cabinet of plastic dust that may develop in the trimming and finishing of the plastic articles. From the chamber 37 the plastic particles are driven by the impeller into the duct 23 by which the reground material is delivered to the extruder hopper 11.

In addition to its blower function, the grinder-impeller drum 38 also functions to mix the charges of virgin material delivered from the hopper 20 through the duct 21 with the reground material. To this end, a lower discharge end of the duct 21 extends downwardly and inwardly through a supporting flange 68 at the forward end of the barrel 43, with its discharge end directed through a central opening 69 in the back of the housing 34 generally toward the hub 39. As the material drops from the discharge mouth of the duct 21, it is caught in radially outwardly extending distribution channels 70 (FIGS. 5 and 6) along the back of the rotor 38 and centrifugally propelled from the perimeter of the rotor in between the impeller vanes 65. Desirably there is one of the distribution channels 70 for each space between impeller vanes. Each of the channels desirably has a smaller inner, material-receiving blind end portion 71 which leads into a substantially wider remaining portion of the channel which opens through the perimeter of the rotor. Thereby fairly uniform commingling of the virgin material with the reground material is attained, and the mixture propelled from the unit through a tangential opening 72 (FIG. 4) in the cylindrical wall of the housing 34 leading into a generally tangential discharge nozzle 73 to which the delivery duct 23 is connected.

In order to facilitate the propelling and mixing action of the channels 70, means are provided for indrawing of air by the impeller in the direction of movement of the virgin material charged into the housing. Conveniently this is accomplished by providing a spaced relation between the flange 68 and the back of the housing 34, at least in the vicinity of the charger duct 21. Accordingly, a spacer block 74 (FIG. 6) is disposed between the flange 68 and the housing along the lower portion of the joint and has an inner edge curved substantially complementary to the adjacent edge of the opening 69 so that any material dropping onto the curved surface of the spacer will readily enter through the opening. This spacer is of limited segmental form so as to leave substantial gap area through preferably greater than 180° between the flange 68 and the housing 34 beyond the ends of the segmental spacer. A plurality of bolts 75 secure the flange 68 to the housing 34 with the spacer 74 clamped therebetween and with small spacer blocks 77 located at the bolts beyond the spacer 74. To prevent inadvertent escape of any of the plastic particles and to prevent entrance of undesirable foreign material, a screen 78 is mounted over the air entry gap. Through this arrangement, it will be apparent that air may be drawn in by the fan action of the impeller through the screened gap at the back of the housing 34 and more particularly in the region of the discharge and of the charging duct 21, with a desirable eduction across the mouth of the duct to enhance movement of the material therefrom into the working chamber 37.

Means are provided for controlling operation of the virgin material charging apparatus in coordination with the trimming and sizing apparatus 15 and with the operation of the unit 18. Accordingly, the charging plunger 22 is operated by a piston rod 79 of an actuator including a cylinder 80, and desirably driven pneumatically to reciprocate the plunger 22. Compressed air for driving the actuator 80 is supplied through conduits 81 leading from a control valve 82 which is operated by a reciprocating cam 83 driven by suitable mechanism within the apparatus 15 coordinated with the trimming of each article therein. Thereby a makeup charge of granular virgin material is adapted to be rammed from the hopper 20 into the makeup duct 21 for each article processed in the apparatus 15. However, this should occur only while the grinder-impeller rotor 38 is operating. Therefore the air supply line 81 is controlled by a solenoid valve 84 to be opened only when the motor 44 is running. For this, the operating solenoid for the valve 84 is connected into electrical control circuitry 85 for the motor and which includes a control switch 87 which upon being closed energized the motor control circuit through a relay 88 closing suitable contacts while the control switch is closed. Thereby, coincident with energizing, the valve 84 is opened to activate the air supply line for the actuator 80.

To avoid overloading the supply hopper 11, a normally closed safety switch 89 is mounted therein at a maximum load height and additional material opens the switch to break the connecting circuit to the solenoid for the air line valve 84 so that this valve then closes and the actuator 80 is inactivated even though the control valve 82 may continue to function so that any other devices that may be controlled thereby will continue to function. Automatically upon sinking of the level of material in the hopper 11 below the maximum level, resumption of replenishing virgin material charging of the unit 18 results. Sometimes metallic particles of a size that might be damaging to the high-speed rotor and grinding members may be delivered with the trimmings or even with the virgin material. Therefore, safety shutdown means are provided, conveniently comprising an electrically grounded connection 90 to the housing 34 leading from a solenoid 91 connected to a normally closed switch 92 in the energizing circuit for the relay 88. The other end of the safety circuit 90 is grounded to the motor casing 44 and the barrel 43, the latter being electrically insulated from the housing 34 by having the spacers 74 and 77 of a dielectric material such as Bakelite. The screen 78 may be made from a dielectric, plastic material or suitably insulated from either the flange 68 or the housing 34. Also, the washers 93 are of an electrically insulating material. Hence, the safety switch 92 remains closed until a metal particle lodges between the rotor 38 and the cutter block 58 whereupon an electrical circuit is completed through the circuit 90, the solenoid 91 energized and the switch 92 opened, the relay 88 deenergized, the motor 44 stopped to stop the rotor, and the solenoid valve 84 closed to stop operation of the actuator 80. The offending metallic particle can then be removed and the apparatus restarted.

An advantage of grinding the thermoplastic scrap immediately as it accrues is that moisture absorption is at least minimized, and avoided where the scrap is still possessed of substantial residual molding heat (which may be as much as 200° F. with some materials).

Where different, combined, selective and like color or material combination effects are desired in the produced articles, a plurality of the virgin material hoppers 20 and charge metering devices 22 may be provided in battery or selective orientation to feed their particular contents through a common duct or individually to the unit 18.

Any suitable covering and dust-eliminating means may be used in conjunction with the supply hopper 11 as desired or needed.

It will be understood that variations and modifications may be effected without departing from the spirit and scope of the novel concepts of this invention.

I claim as my invention:

1. A method of conditioning thermoplastic material for use in molding a succession of articles in a machine to which the material in a subdivided state is fed from a hopper and from which machine the molded articles pass successively to apparatus operative to trim scrap from the successive articles, comprising:
   comminuting the scrap material;
   supplying successive individual charges of subdivided virgin material to the scrap material coordination with the successive trimming operations of said apparatus to make up for the amount of plastic material remaining in the trimmed articles; and
   commingling the materials and delivering the commingled materials to said hopper.

2. A method according to claim 1, comprising supplying said charges of virgin material to the scrap material from the mouth of a discharge duct, and effecting eduction of air across the mouth of the duct to enhance movement of the material therefrom.

3. In combination with a machine and a hopper from which subdivided thermoplastic material is fed and which machine produces a succession of molded articles, and apparatus operative to receive and trim scrap from the successive articles:
   means for comminuting the scrap material from said apparatus;
   means for supplying successive individual charges of subdivided virgin material to the comminuted scrap material;
   means for coordinating said supplying means with the successive trimming operations of said apparatus whereby to make up for the amount of plastic material remaining in each successive trimmed article; and
   means for commingling the materials and delivering the commingle materials to said hopper.

4. A combination according to claim 3, including a discharge duct having a mouth from which the virgin makeup material is discharged to the comminuted scrap material, and means to effect eduction of air across the mouth of the duct to enhance movement of the makeup material therefrom.

5. A combination according to claim 3, in which said comminuting means comprise a wheeled unit having a housing defining a chamber, said housing having an attachment flange, means releasably attaching said flange to said apparatus, said housing having an opening through which scrap material is deposited into said chamber from said apparatus, said comminuting means including a rotor mounted within said chamber, means for driving said rotor mounted on said unit, said means for supplying virgin material comprising a receptacle on a stand separate from said unit and having a charging duct leading from said receptacle and said means for controlling comprising a device for driving the individual charges from said receptacle into said duct.

6. A combination according to claim 3, comprising a housing having therein said means for comminuting and the means for commingling in the form of a rotor, a motor to drive said rotor, and means for correlating operation of said supplying means with said motor and operative to stop operation of said supplying means when the motor stops.

7. A combination according to claim 3, in which said supplying means comprise a hopper having an outlet and a duct leading from said outlet, and a plunger device for driving individual charges of the makeup virgin material from said outlet into said duct.

8. A combination according to claim 3, comprising electrically controlled means for operating said means for supplying virgin material and including control switch means located on said hopper and arranged to be operated when the level of material in said hopper reaches a predetermined height whereby to stop operation of said means for supplying.